United States Patent
Akirav et al.

(10) Patent No.: US 9,678,672 B2
(45) Date of Patent: *Jun. 13, 2017

(54) SELECTIVE ERASURE OF EXPIRED FILES OR EXTENTS IN DEDUPLICATING VIRUTAL MEDIA FOR EFFICIENT FILE RECLAMATION

(71) Applicant: INTERNATIONAL BUSINESS MACHINES CORPORATION, Armonk, NY (US)

(72) Inventors: Shay H. Akirav, Petach-Tikva (IL); Michael Hirsch, Mazkeret Batya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,343

(22) Filed: Apr. 8, 2016

(65) Prior Publication Data

US 2016/0224254 A1    Aug. 4, 2016

Related U.S. Application Data

(63) Continuation of application No. 13/625,355, filed on Sep. 24, 2012, now Pat. No. 9,336,223.

(51) Int. Cl.
*G06F 17/30* (2006.01)
*G06F 3/06* (2006.01)

(52) U.S. Cl.
CPC .......... *G06F 3/0608* (2013.01); *G06F 3/0643* (2013.01); *G06F 3/0652* (2013.01); *G06F 3/0664* (2013.01); *G06F 3/0682* (2013.01); *G06F 17/3015* (2013.01); *G06F 17/30156* (2013.01); *G06F 17/30233* (2013.01)

(58) Field of Classification Search
CPC .......... G06F 17/3015; G06F 17/30156; G06F 17/30233
See application file for complete search history.

(56) References Cited

U.S. PATENT DOCUMENTS

| 6,851,031 B2 | 2/2005 | Trimmer et al. |
| 7,254,672 B1 | 8/2007 | Murray et al. |
| 7,620,765 B1 | 11/2009 | Ohr et al. |
| 7,765,369 B1 | 7/2010 | Prahlad et al. |

(Continued)

FOREIGN PATENT DOCUMENTS

| CN | 102323958 A | 1/2012 |
| CN | 102567426 A | 7/2012 |
| CN | 102591292 A | 7/2012 |

OTHER PUBLICATIONS

Sun Oracle, "Virtual Tape Control System Administrator's Guide," MSP Software, Version 6.1, Dec. 2010 (16 pages).

*Primary Examiner* — William Spieler
(74) *Attorney, Agent, or Firm* — Griffiths & Seaton PLLC

(57) ABSTRACT

Expired files in the deduplicating virtual media are selectively erased using a backup application for notifying a backup repository of which expired files are no longer required. The space of the expired files is reclaimed for reuse. Virtual space of the expired files is reserved for allowing the backup application to seek past the reclaimed space to subsequent data in the deduplicating virtual media. Expired files are identified and positions of the expired files are determined in the deduplicating virtual media thereby converting the positions into a list of expired files that is sent to the backup repository.

13 Claims, 4 Drawing Sheets

(56) References Cited

U.S. PATENT DOCUMENTS

| | | |
|---|---|---|
| 7,873,781 B2 | 1/2011 | Blendermann et al. |
| 8,027,109 B1 | 9/2011 | Lyman et al. |
| 2004/0044863 A1 | 3/2004 | Trimmer et al. |
| 2006/0143443 A1 | 6/2006 | Cohen et al. |
| 2008/0016130 A1 | 1/2008 | Cannon et al. |
| 2008/0263272 A1 | 10/2008 | Blendermann et al. |
| 2010/0064166 A1 | 3/2010 | Dubnicki et al. |
| 2010/0281081 A1 | 11/2010 | Stager et al. |
| 2010/0332452 A1 | 12/2010 | Hsu et al. |
| 2012/0124013 A1 | 5/2012 | Provenzano |

SELECTIVE ERASURE OF EXPIRED FILES OR EXTENTS IN DEDUPLICATING VIRUTAL MEDIA FOR EFFICIENT FILE RECLAMATION

CROSS REFERENCE TO RELATED APPLICATIONS

This application is a Continuation of U.S. patent application Ser. No. 13/625,355 filed on Sep. 24, 2012.

BACKGROUND OF THE INVENTION

Field of the Invention

The present invention relates in general to computers, and more particularly to efficient file reclamation in deduplicating virtual media in a computing environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components and it is often necessary to retain back up copies of files while also reclaim space used by expired versions of files. Hence, a need exists for increased efficiency for efficient file reclamation in deduplicating virtual media.

SUMMARY OF THE DESCRIBED EMBODIMENTS

Various embodiments are provided for efficient file reclamation in deduplicating virtual media using a processor device. In one embodiment, a method comprises selectively erasing expired files in the deduplicating virtual media using a backup application for notifying a backup repository which of the expired files no longer are required by decrementing reference counts of storage blocks, the storage blocks associated with the expired files by the deduplication device, and reclaiming space of the expired files for reuse whose reference counts drop to zero, wherein virtual space of the expired files is reserved by replacing the storage blocks by explicit gaps in a table of contents of an internal storage container, thereby allowing the backup application to seek past the reclaimed space to subsequent data in the deduplicating virtual media; and identifying the expired files and determining positions of the expired files in the deduplicating virtual media thereby converting the positions into a list of expired files that is sent to the backup repository.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
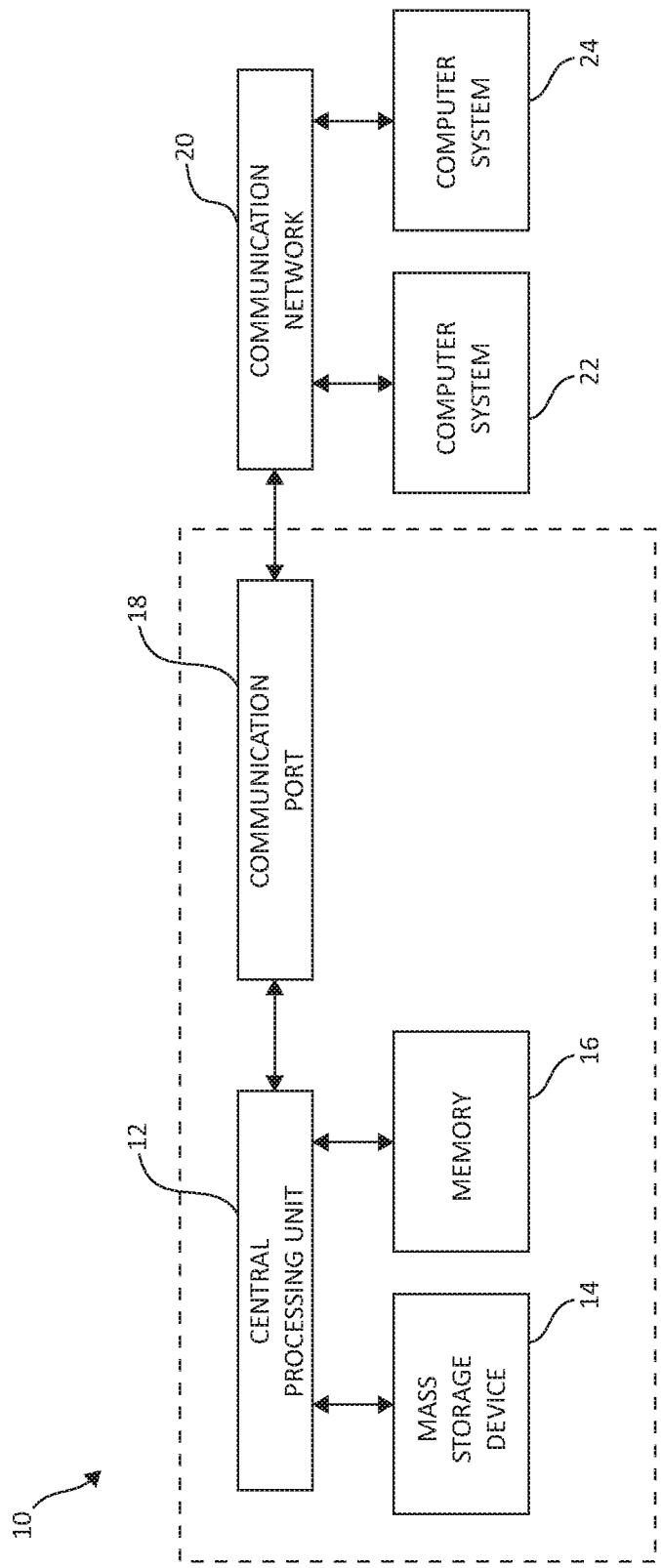
FIG. 1 is a block diagram illustrating a computer storage environment having an exemplary storage device in which aspects of the present invention may be realized.

As previously mentioned, computing systems are used to store and manage a variety of types of data in a variety of storage systems. For example, traditionally, a Tivoli Storage Manager (TSM) fills tape cartridges (or volumes) with backup copies of files, while maintaining a philosophy of "incremental forever." In this mode, the TSM is required to keep only the last n copies of each file. However, some files are updated more frequently than other files, causing the older file versions to expire. Yet, valid volumes experience "holes" created by the expired data because files are written to volumes together. As time progresses, valid volumes contain less and less unexpired data, but this unexpired data holds the entire volume hostage, preventing it from being reused.

In traditional tape systems, the only way to reclaim the space used by expired versions of files in a source volume is to copy the unexpired files to a new destination volume, and then to reuse the source volume. This is called "tape reclamation." It is a time-consuming and resource-consuming operation. It requires files to be read from the source volume and then to be written back to the target volume, using up valuable bandwidth. Each reclamation process also consumes 2 tape drives. If the tape system is a deduplicating virtual tape library (or backup repository) like IBM's® ProtecTIER®, then the files written to the target library must be re-deduplicated, consuming yet more CPU and bandwidth resources in the deduplicating virtual tape library.

One alternative proposed for backup repositories is synthetic full backups. In this scheme, a backup application builds a virtual copy operation between one or more source volumes and a target volume. It identifies to the backup repository which data in the source volumes must be virtually "copied" to the target and the order of the "copies", possibly adding new data during the process. This solution may be applied, but requires a complicated control protocol between the backup application and backup repository.

Yet, to address the inefficiencies of doing a full copy to a new volume such as in tape reclamation, or a virtual copy to a new volume like synthetic full backup, the illustrated embodiments described herein provide a solution where the backup application notifies the backup repository which extents (or expired files) of a volume will no longer be required. The backup repository can immediately free up the space and other resources used to store this data. If asked to directly read this particular data in the future, the backup repository may return either zero-valued bytes or may return an error. The backup repository can still reserve virtual (empty) space for this data allowing, for example, the backup application to "seek" past the reclaimed space to valid data later in a volume.

As described herein, a volume may be a virtual tape cartridge, or a deduplicating virtual media device in a virtual tape library system, or it may be a container file storing backup files in a file system implemented by a backup repository that implements the operations described herein, such as a file system exported by a network-attached storage (NAS) device. As mentioned, the files system may be a deduplicating files system.

For example, in a deduplicating virtual tape library, the backup application mounts a virtual volume in a virtual tape drive of a virtual tape library. The deduplicating virtual tape library then sends a modified small computer system interface (SCSI) ERASE command to the virtual tape drive, informing it which of the tape blocks (e.g., one or more extents of tape blocks) may be cleared by the deduplicating virtual tape library with the space of the tape blocks being recycled. The deduplicating virtual tape library will free the physical storage used to maintain the contents of those tape blocks, and will make a note in the metadata structures (in IBM's ProtecTIER, this is called the SCSI directory) of the deduplicating virtual tape library that this storage has been released. The positions of any filemarks inside erased extents will be maintained. Future seeks will skip past this section of the virtual volume as if it was still there. In the form of a deduplicating file system implemented by the backup repository, the backup application and the backup repository may also agree on a protocol that would allow the backup application to erase and reclaim the space used by an extent in a container file that the backup application had written in the file system implemented by the backup repository.

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
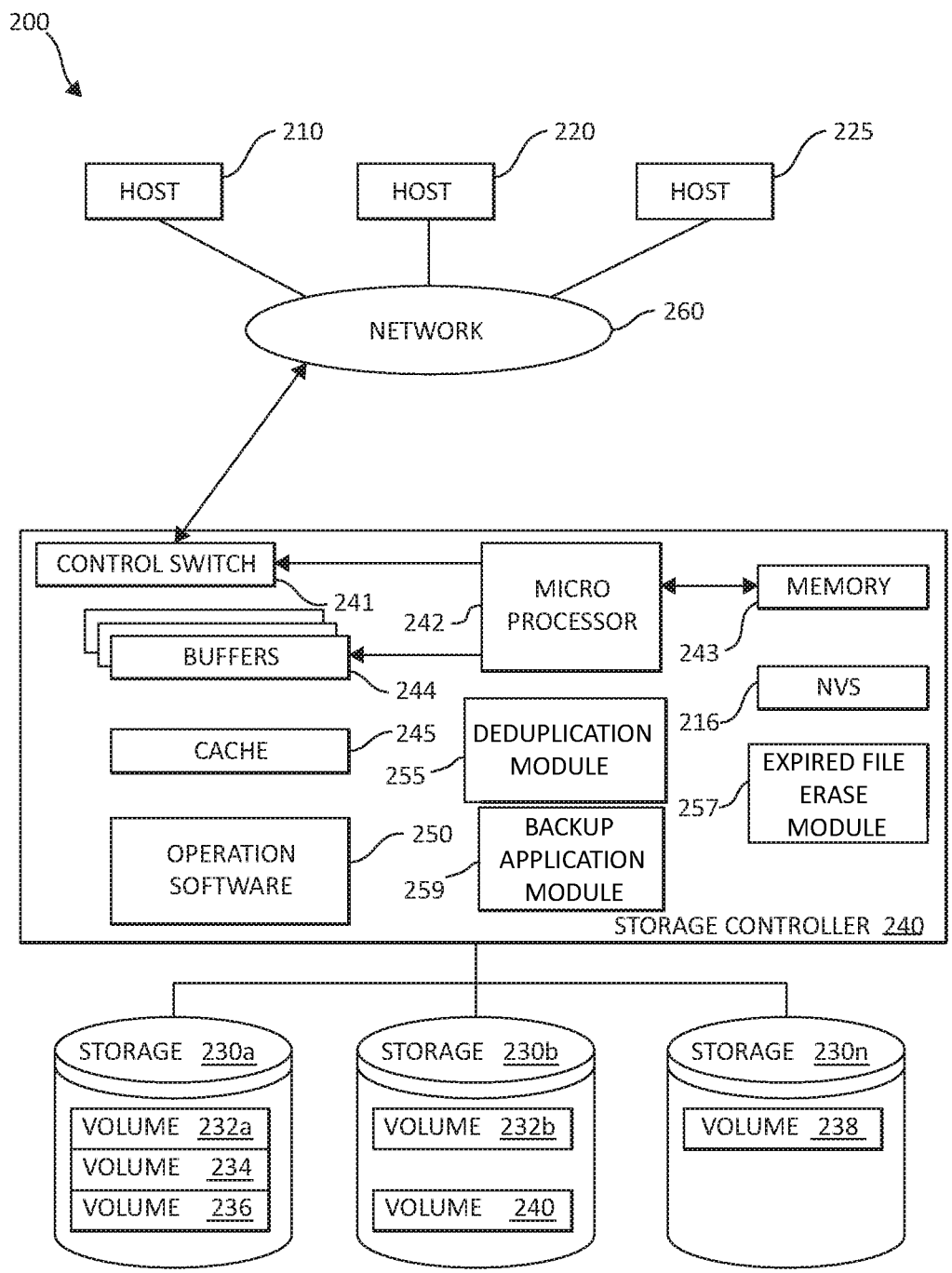
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computer storage environment. In one embodiment, system memory 243 includes, is associated, or is in communication with the operation software 250 in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention.

In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a deduplication module 255, expired file erase module 257, backup application module 259 in a computer storage environment. The deduplication module 255, the expired file erase module 257, the backup application module 259 may work in conjunction with each and every component of the storage controller 240, the hosts 210, 220, 225, and storage devices 230. The deduplication module 255, the expired file erase module 257, the backup application module 259 may be structurally one complete module working together and in conjunction with each other for performing such functionality as described below, or may be individual modules. The deduplication module 255, the expired file erase module 257, the backup application module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, deduplication module 255, the expired file erase module 257, the backup application module 259 on which information may be set. Multiple buffers 244 may be implemented with the present invention in a computing environment, or performing other functionality in accordance with the mechanisms of the illustrated embodiments.

In one embodiment, by way of example only, the host computers or one or more physical or virtual devices, 210, 220, 225 and the storage controller 240 are connected through a network adaptor (this could be a fiber channel) 260 as an interface i.e., via a switch sometimes referred to as "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, deduplication module 255, the expired file erase module 257, the backup application module 259 are in communication with each other and may be separate or one individual component(s). Also, several if not all of the components, such as the operation software 245 may be included with the memory 243 in a computer storage environment. Each of the components within the storage device may be linked together and may be in communication with each other for purposes suited to the present invention.

Figure 3:
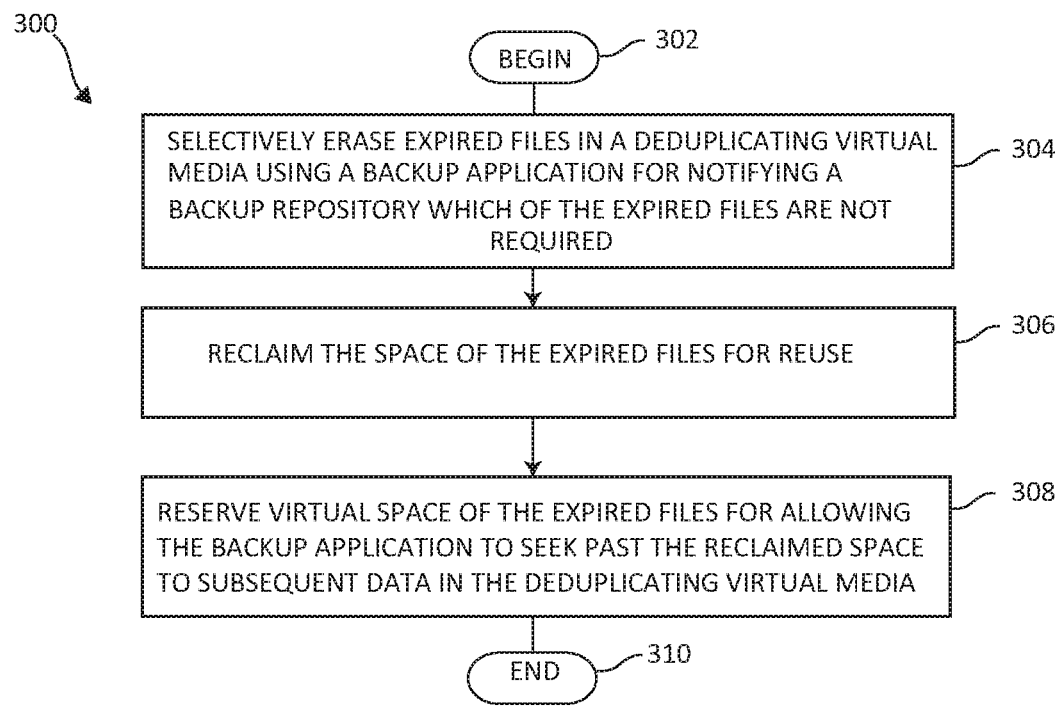
FIG. 3 is a flow chart diagram illustrating an exemplary method for efficient file reclamation in deduplicating virtual media in which aspects of the present invention may be realized.

Turning now to FIG. 3, an exemplary method 300 efficient file reclamation in deduplicating virtual media is illustrated. The method 300 begins (step 302) by selectively erasing expired files in the deduplicating virtual media using a backup application for notifying a backup repository which of the expired files are no longer required (step 304). The space of the expired files is reclaimed for reuse (step 306). Virtual space of the expired files is reserved for allowing the backup application to seek past the reclaimed space to subsequent data in the deduplicating virtual media (step 308). The method 300 ends (step 310).

Figure 4:
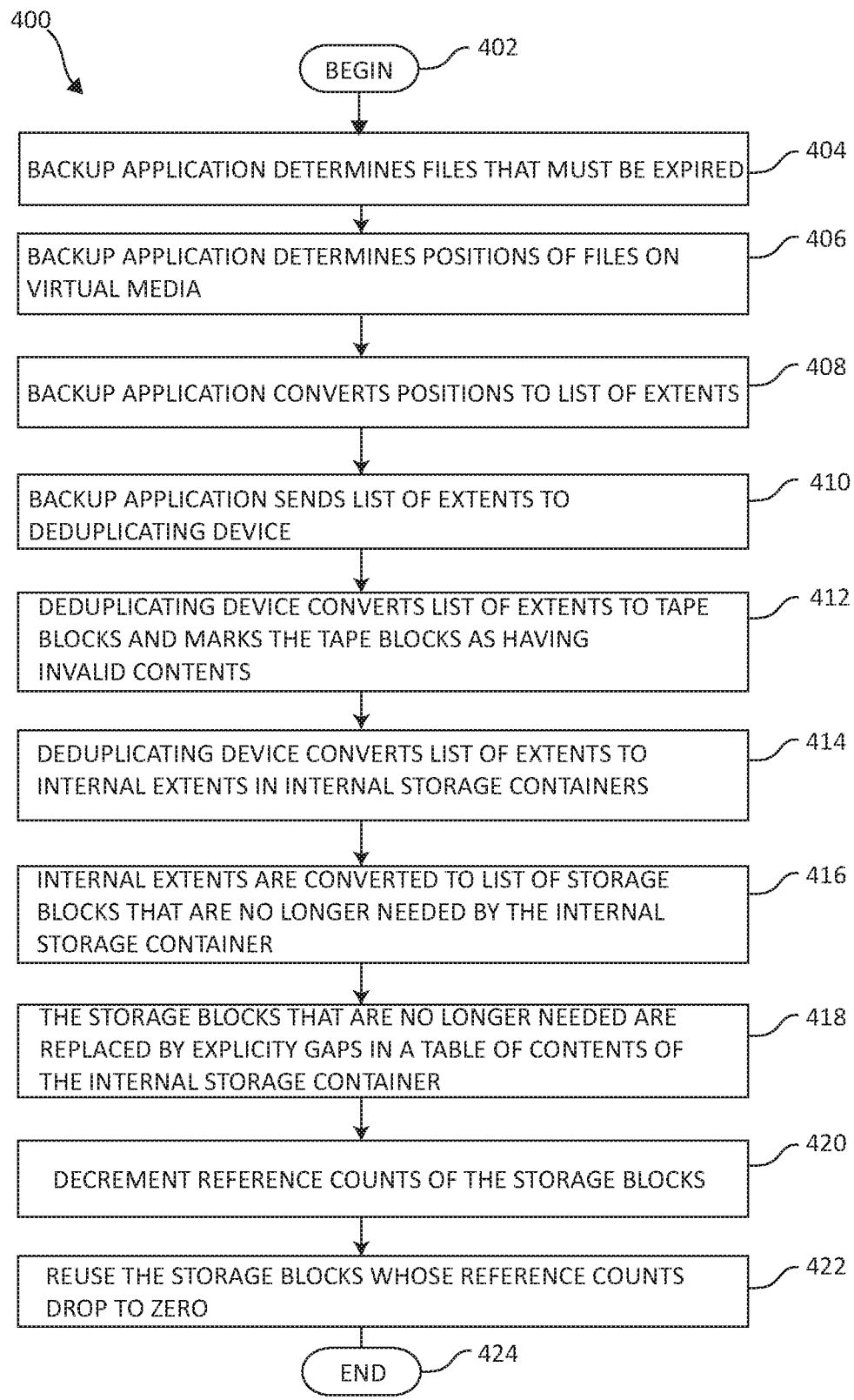
FIG. 4 is a flow chart diagram illustrating an additional exemplary method for efficient file reclamation in deduplicating virtual media in which aspects of the present invention may be realized.

Based upon the foregoing, turning now to FIG. 4, an additional exemplary method 400 for efficient file reclamation in deduplicating virtual media is depicted. The method 400 begins (step 402) by determining by the backup application those files that must be expired (step 404). The backup application determines the positions of the files on the virtual media (e.g., deduplicating virtual media) (step 406). The backup application converts the positions to a list of extents (step 408). The backup application sends the list of extents to a deduplicating device (step 410). The deduplicating device converts the list of extents to tape blocks and marks the tape blocks as having invalid contents (step 412). The deduplicating device converts the list of extents to internal extents in internal storage containers (step 414). Internal extents are converted to a list of storage blocks that are no longer needed by the internal storage container (step 416). The storage blocks that are no longer needed by the internal storage container are replaced by explicit gaps in a table of contents in the internal storage container (step 418). Reference counts of the storage blocks that are no longer needed by the internal storage container are decremented (step 420). The storage blocks whose reference counts drop to zero may be reused and reclaimed (step 422). The method 400 ends (step 424).

In one embodiment, by way of example only, as described above in FIGS. 3-4, the backup application initiates the process. For each virtual media (cartridge or container file on a network attached storage system (NAS) storage device), the backup application will make a list of expired files. By noting the position of the expired files in the virtual media, the backup application can determine exactly the extent's start position and length of the virtual media that is no longer needed. It should be noted that the list of extents may or may not be aligned to the original writes to the virtual media (in the case of a cartridge, this alignment is actually the tape blocks). An identifier of the virtual media and list of extents is communicated to the deduplicating virtual tape library (or the deduplicating NAS device). In the case of a virtual cartridge, the identifier may be a barcode. In the case of a NAS device, the identifier may be the external file name.

Upon receipt of the list of extents, the deduplicating virtual library starts operating. The deduplicating virtual library translates the extents to tape blocks and updates the deduplicating virtual library's record of these tape blocks to note that the contents of these tape blocks are no longer valid. The deduplicating virtual library then translates the extents to their internal extents (internal start position and length) in internal storage containers. In IBM'S® Protec-TIER®, the internal storage containers are called Deduplicated Files System (DFS) files. One of the central embodiments of the present invention is the ability to selectively delete internal extents from the DFS files. Each DFS file must translate each internal extent to a list of storage blocks that the DFS file no longer needs (referred to as "deleted storage blocks"). Then the table of contents of the DFS file (ordered list of storage blocks) must be updated to note the gap left by each deleted storage block. Finally, the list of deleted storage blocks must be passed on to the storage block manager (in ProtecTIER®, this is referred to as the "Storage Manager" or "STM"). The STM decrements the reference count of each of the deleted storage blocks. When a reference count drops to zero, a storage block is no longer needed and the storage block's space can be reused. If the reference count is not zero, this indicates that the storage block is still in use elsewhere (e.g., an alternative DFS file). This is because the storage block is a common storage between the DFS file and at least one other DFS file, and the space is still needed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for efficient file reclamation in deduplicating virtual media by a processor device in a computing environment, the method comprising:
   selectively erasing expired files in the deduplicating virtual media using a backup application for notifying a backup repository which of the expired files no longer are required by decrementing reference counts of storage blocks, the storage blocks associated with the expired files by the deduplication device, and reclaiming space of the expired files for reuse whose reference counts drop to zero, wherein virtual space of the expired files is reserved by replacing the storage blocks by explicit gaps in a table of contents of an internal storage container, thereby allowing the backup application to seek past the reclaimed space to subsequent data in the deduplicating virtual media; and
   identifying the expired files and determining positions of the expired files in the deduplicating virtual media thereby converting the positions into a list of expired files that is sent to the backup repository.

2. The method of claim 1, further including converting the list of expired files to tape blocks, and marking the tape blocks as having invalid contents.

3. The method of claim 2, further including converting the list of expired files to internal extents in internal storage containers.

4. The method of claim 3, further including converting the internal extents to a list of storage blocks that are no longer needed by the internal storage container.

5. The method of claim 4, wherein the internal storage container is a deduplicated file system (DFS) file.

6. A system for efficient file reclamation in deduplicating virtual media in a computing environment, the system comprising:
   a deduplication device;
   the deduplicating virtual media, manipulated by the deduplication device; and
   a processor device, in communication with the deduplicating virtual media, operable in the computing storage environment, wherein the processor device:
   selectively erases expired files in the deduplicating virtual media using a backup application for notifying a backup repository which of the expired files no longer are required by decrementing reference counts of storage blocks, the storage blocks associated with the expired files by the deduplication device, and reclaiming space of the expired files for reuse whose reference counts drop to zero, wherein virtual space of the expired files is reserved by replacing the storage blocks by explicit gaps in a table of contents of an internal storage container, thereby allowing the backup application to seek past the reclaimed space to subsequent data in the deduplicating virtual media, and
   identifies the expired files and determines positions of the expired files on the deduplicating virtual media thereby converting the positions into a list of expired files that is sent to the backup repository.

7. The system of claim 6, wherein the processor device converts a list of expired files to internal extents in internal storage containers.

8. The system of claim 7, wherein the processor device converts the internal extents to a list of storage blocks that are no longer needed by the internal storage container.

9. The system of claim 8, wherein the internal storage container is a deduplicated file system (DFS) file.

10. A computer program product for efficient file reclamation in deduplicating virtual media by a processor device, the computer program product comprising a computer-readable storage medium having computer-readable program code portions stored therein, the computer-readable program code portions comprising:
    a first executable portion that selectively erases expired files in the deduplicating virtual media using a backup application for notifying a backup repository which of the expired files no longer are required by decrementing reference counts of storage blocks, the storage blocks associated with the expired files by the deduplication device, and reclaiming space of the expired files for reuse whose reference counts drop to zero, wherein virtual space of the expired files is reserved by replacing the storage blocks by explicit gaps in a table of contents of an internal storage container, thereby allowing the backup application to seek past the reclaimed space to subsequent data in the deduplicating virtual media; and
    a second executable portion that identifies the expired files and determines positions of the expired files on a virtual media thereby converting the positions into a list of expired files that is sent to the backup repository.

11. The computer program product of claim 10, further including a third executable portion that converts a list of expired files to internal extents in internal storage containers.

12. The computer program product of claim 11, further including a fourth executable portion that converts the internal extents to a list of storage blocks that are no longer needed by the internal storage container.

13. The computer program product of claim 12, wherein the internal storage container is a deduplicated file system (DFS) file.

* * * * *